Apr. 10, 1923.
E. H. WICKERT
PNEUMATIC TIRE
Filed July 13, 1921
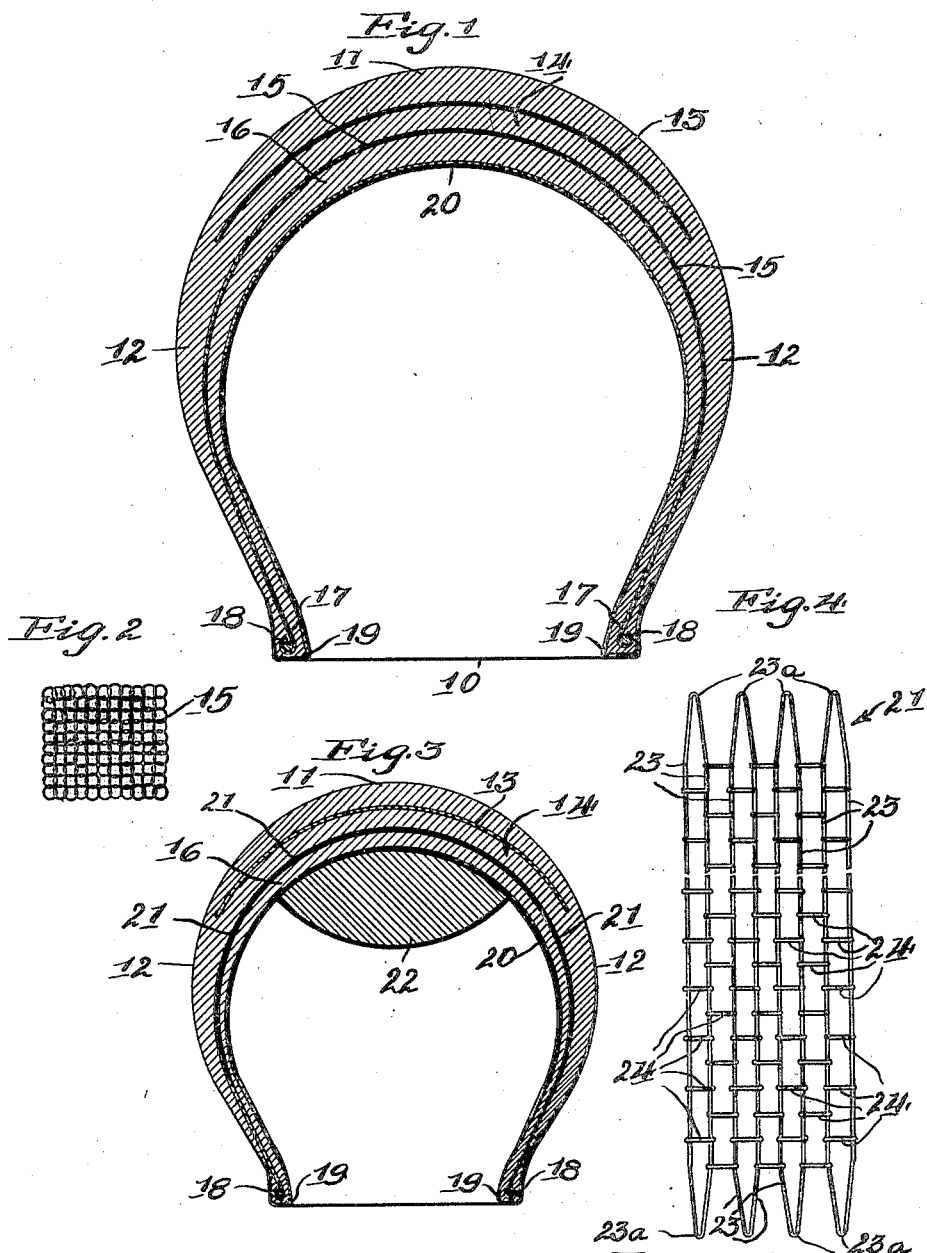
Inventor:
Elmer H. Wickert,
by: John E. Stryker
his Attorney.

Patented Apr. 10, 1923.

1,451,640

UNITED STATES PATENT OFFICE.

ELMER H. WICKERT, OF ST. PAUL, MINNESOTA.

PNEUMATIC TIRE.

Application filed July 13, 1921. Serial No. 484,418.

*To all whom it may concern:*

Be it known that I, ELMER H. WICKERT, a citizen of the United States, residing at St. Paul, in the county of Ramsey and State of Minnesota, have invented new and useful Improvements in Pneumatic Tires, of which the following is a specification.

The object of my invention is to provide a durable and comparatively inexpensive pneumatic tire casing with protection against "blow outs."

A further object of my invention is to provide a novel and efficient reinforcement for preventing stretching or distorting of the tire casing.

The fabric or cord reinforcement in the tires commonly used gradually stretches and becomes weakened in spots because of the uneven strain caused by travel on rough roads. This, as is well known, results in blow outs and shortens the life of the tire. By my novel use of a flexible but practically unstretchable reinforcement I greatly reduce trouble due to blow outs and punctures and lengthen the life of the tires.

The drawings illustrate what I at present believe to be the best form of my device. Referring to the drawings Figure 1 is a transverse section through my improved pneumatic tire; Fig. 2 is a fragmentary plan view of the chain mail reinforcement; Fig. 3 is a transverse section of an alternate form of tire and Fig. 4 is a fragmentary plan view of the reinforcement in the alternate form.

My device belongs to the general class of pneumatic tires adapted to be secured to the rim of a vehicle wheel in the usual manner with the annular opening 10 abutting against the wheel rim and the tread 11 arranged to bear upon the road. The tread 11 and side walls 12 are composed of rubber varying in thickness and embedded within the tread is an armor fabric 13 which passes circumferentially around the tire. This element 13 may consist of tire fabric, or of a plurality of over-lapping metallic discs which are impervious to sharp objects. Adjacent to the fabric 13 is another layer of rubber 14 of substantial thickness. This layer 14 surrounds the chain mail reinforcement 15. As shown in Fig. 2 the chain mail is made of a plurality of small rings or closed loops which are linked one with another to form a metal fabric which is embedded between the layer of rubber 14 and another layer 16. This chain mail reinforcement 15 extends entirely around the tire and its free side edges 17 are securely fastened to annular cords 18 which are embedded within the beads 19 of the tire. A fabric lining 20 of the usual kind completes the tire, being turned over the beads 19 to form a durable abutment for the vehicle wheel.

In the alternate form of my device the tread 11, the walls 12, the armor fabric 13, layers of rubber 14 and 16, the cords 18, beads 19 and lining 20 are similar to those described above but the reinforcement 21 is specifically different from the reinforcements 15, and a pad 22 is provided. The reinforcement 21 is composed of a series of spaced, flexible wires or small cables 23 connected by a series of transverse links 24. The wires 23 are embedded between the layers of rubber 14 and 16, their ends 23ᵃ being secured to the cords 18 and the links 24 extend circumferentially around the tire. The connection between the ends of the links 24 and the wires 23 are all pivotal so that the reinforcement 21 is flexible.

In order to prevent the links 24 and wires 23 from kinking in case weight should be placed on the tire while flat or deflated I provide the cushion 22 which is made of soft or sponge rubber and extends circumferentially around the tire within the lining 20. Thus when the tire is flat the cushion 22 carries the weight of the vehicle and prevents sudden bending of the reinforcement 21.

Having described my invention what I claim as new and desire to protect by Letters Patent is:

1. In a pneumatic tire casing having a tread on its outer periphery and being open at its inner periphery, beads at the lateral edges of the inner periphery, annular cords within said beads, an inner lining within the tire, a plurality of flexible spaced wires each of which is connected at one end to one of said cords and at its opposite end to the other of said cords, and spaced links joining adjacent wires and extending circumferentially around the tire.

2. In a pneumatic tire casing having a tread on its outer periphery and being open at its inner periphery, annular beads at the lateral edges of the inner periphery, annular cords within said beads, a lining on the inner surface of the tire, a plurality of flexible and spaced wires between said tread and lining, each of said wires extending in an arc from one of said cords to the other, and relatively short links joining adjacent wires, said links being spaced apart to form with said wires a foraminous reinforcement.

3. In a pneumatic tire casing open at its inner periphery and having a tread on its outer periphery, beads at the lateral edges of the inner periphery, annular cords within said beads, a plurality of flexible, spaced wires, each of said wires being secured at opposite ends to opposite cords in said beads, spaced links joining adjacent wires and a rubber pad within said wires and links.

In testimony whereof, I have hereunto signed my name to this specification.

ELMER H. WICKERT.